United States Patent
Koda et al.

[11] 3,824,003
[45] July 16, 1974

[54] LIQUID CRYSTAL DISPLAY PANEL

[75] Inventors: Nobuo J. Koda, Vista; Lewis T. Lipton, Olivenhain, both of Calif.

[73] Assignee: Hughes Aircraft Company, Culver City, Calif.

[22] Filed: May 7, 1973

[21] Appl. No.: 358,259

[52] U.S. Cl. ............ 350/160 LC, 307/38, 307/251, 340/324 R
[51] Int. Cl. .............................................. G02f 1/16
[58] Field of Search........... 307/38, 251; 340/324 R; 350/160 LC

[56] References Cited
UNITED STATES PATENTS

| | | | |
|---|---|---|---|
| 3,631,411 | 12/1971 | Kosonocky | 340/173 LS |
| 3,654,606 | 4/1972 | Marlowe et al. | 340/166 |
| 3,723,749 | 3/1973 | Shapiro | 307/38 |
| 3,781,864 | 12/1973 | Fugita | 340/336 |

*Primary Examiner*—Edward S. Bauer
*Attorney, Agent, or Firm*—W. H. MacAllister; John M. May

[57] ABSTRACT

In a liquid crystal matrix display panel for line-at-a-time driving at TV rate, an array of field effect transistor switches enable inputs to respective storage capacitors thereby providing storage of signals for a sufficient time for the liquid crystal material to respond. The transistor's drain pad also serves as one plate of the associated storage capacitor and a portion of its gate electrode is effectively the second plate, thereby minimizing the number of drive lines required and facilitating the fabrication of a practical device using state-of-the-art thin film transistor technology.

6 Claims, 4 Drawing Figures ing a "simple" configuration employing one biased diode per display element, a double-diode-capacitor scheme, and field-effect-transistor-capacitor scheme. The article noted that "an economically practical liquid crystal matrix display obviously requires that the circuitry be realized in integrated form . . . however, a complete display structure requires multilevel metalization and high yield on a large substrate area."

LIQUID CRYSTAL DISPLAY PANEL

BACKGROUND OF THE INVENTION

This invention relates generally to liquid crystal displays and in particular relates to a monolithic liquid crystal matrix display panel.

In the paper "Liquid Crystal Displays" by Bernard J. Letchner of RCA Laboratories, appearing in "Pertinent Concepts in Computer Graphics," University of Illinois Press, 1969, a number of addressing schemes for a liquid crystal matrix display are discussed, including a "simple" configuration employing one biased diode per display element, a double-diode-capacitor scheme, and field-effect-transistor-capacitor scheme. The article noted that "an economically practical liquid crystal matrix display obviously requires that the circuitry be realized in integrated form . . . however, a complete display structure requires multilevel metalization and high yield on a large substrate area."

Accordingly, it is one object of the present invention to provide an addressing scheme that is particularly adaptable for the fabrication of monolithic displays employing integrated addressing circuitry.

It is a second object of the present invention to provide a liquid crystal matrix display element which can be integrated into an array formed over a large substrate area.

It is yet another object of the present invention to provide a monolithic matrix addressed liquid crystal display panel.

Still another object of the present invention is to provide an addressing scheme for a matrix display that is particularly adaptable for fabrication using thin film transistor techniques.

A more specific object of the present invention is to provide a liquid crystal matrix display capable of line-at-a-time addressing at conventional TV rates.

SUMMARY OF THE INVENTION

The invention which satisfies this and other objects may be briefly described as an array of field-effect-transistor-capacitor matrix elements, wherein the conductive drain pad of the field effect transistor functions as one plate of the capacitive element and a portion of the gate electrode functions as the other plate thereof. Since the drain pad may itself be the reflective electrode driving the liquid crystal material, only two categories of drive lines are required in the matrix; one connecting all of the gates in a given row, and one connecting all of the source electrodes of a given column.

BRIEF DESCRIPTION OF THE DRAWINGS

For a better understanding of the present invention, including two specific embodiments thereof, reference is made to the attached drawings in which.

DETAILED DESCRIPTION

Figure 1:
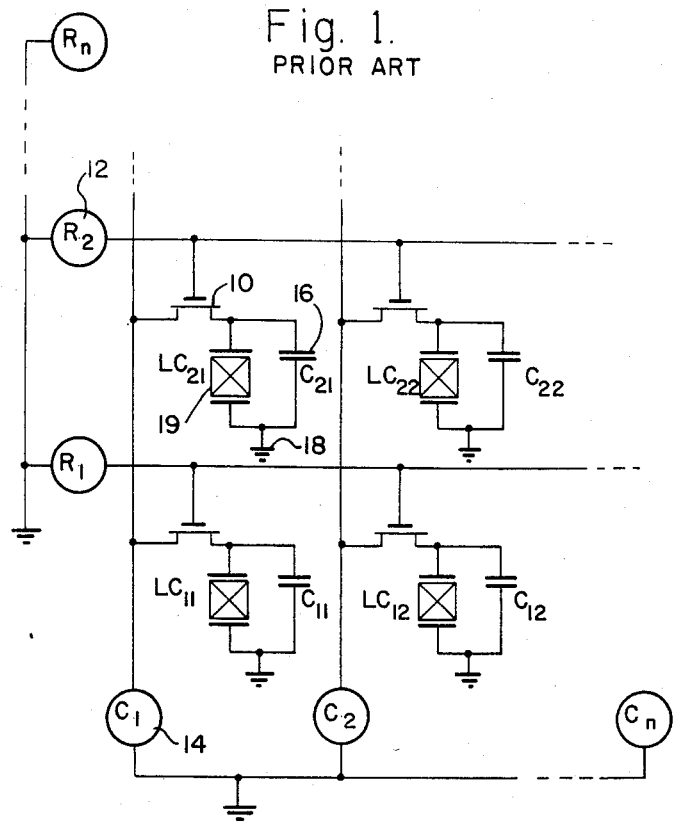
FIG. 1 shows a prior art field effect transistor capacitor addressing scheme.

Referring now with greater particularity to FIG. 1, it may be seen that in a typical prior art field-effect-transistor-capacitor addressing scheme, each individual matrix element comprises a field effect transistor 10 having its gate electrode coupled to a row driver 12 and its source electrode coupled to a column driver 14. Directly coupled to the drain electrode of transistor 10 is one plate of capacitor 16, the other plate being coupled to a ground plane 18. Also shown symbolically in FIG. 1 is a portion of the liquid crystal 19 to be activated by this particular matrix element. (As is well known, an elemental cell within a nematic liquid crystal matrix has the equivalent of a resistance in parallel with a capacitance, typical values being perhaps on the order of $10^9$ ohms and 1 pf.)

Consider now the operation of such a matrix. There is a delay between the application of electric signals across the liquid crystal and the change in optical properties therein. In the steady state condition, the contrast is a smooth monotonic function of voltage; accordingly, a gray scale can be achieved in response to appropriate changes in input signal levels. In general, for use in a matrix display to be operated at a relatively fast (e.g., TV) frame rate, each element must possess both storage and a threshold. In the configuration of FIG. 1, the threshold is provided by transistor 10, while the storage is provided by capacitor 16, which extends the time the signal voltage is across the liquid crystal beyond its relaxation time and thereby enabling the liquid crystal to respond. To provide row-at-a-time scanning, the appropriate row generator ($R_1$, for instance) is activated.

All data for a given row of elements may be clocked serially into a serial-in-parallel-out shift register (not shown) coupled between the input data source and the various column generators $C_1$, $C_2$, etc. A positive signal from $R_1$ forward biases each field effect transistor in row 1 causing them to become conductive and the various voltages produced by the column generators $C_1$, $C_2$ . . . $C_n$ are applied to the respective capacitors $C_{11}$, $C_{12}$, etc., thereby causing the appropriate voltages to be impressed across liquid crystal cell portions $LC_{11}$, $LC_{12}$, etc. Assuming the pulse from row generator $R_1$ to end slightly before the pulses from the column generator, the transistors in row 1 are all cut off and the voltages determined by the column generators remain across the respective parallel combinations of the capacitor and the liquid crystal cell until the end of the present frame period, at which time the cycle is repeated. If, in the next frame, the amplitude of a particular column pulse is larger than in the previous frame, additional charge will be added to the parallel combination of liquid crystal and the capacitor leaving them at a high voltage. On the other hand, if the amplitude is smaller, the charge will be drained and they will be left at a lower voltage. Since the field effect transistor, when enabled by the row generator, can pass current in either direction, no resetting pulse is necessary. Although an N-type enhancement FET has been assumed in the above discussion, similar circuits may be designed to operate with P-type enhancement or N- or P-type depletion field effect transistors.

Figure 2:
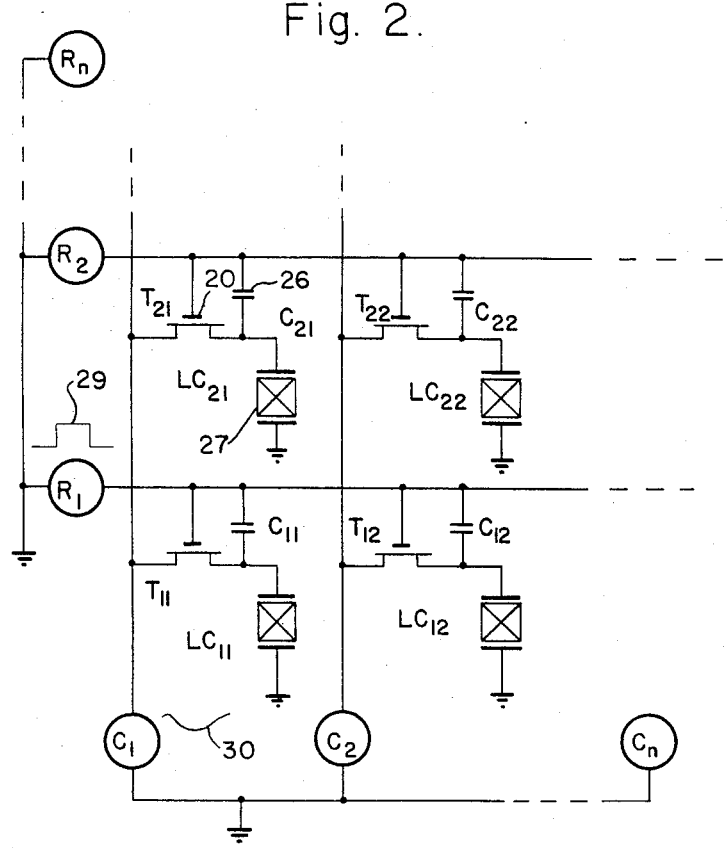
FIG. 2 shows the addressing scheme of the present invention.

Referring now to FIG. 2, wherein the addressing scheme of the present invention is illustrated in circuit schematic form, it may be seen that it also is a fieldeffect-transistor-capacitor addressing scheme adaptable for row-at-a-time addressing. However, it should be noted that in the case of the present invention, capacitor 26 is directly coupled between the drain and the gate of transistor 20, thereby obviating the need for a connection between the capacitor and a separate ground plane. This greatly facilitates fabrication of a practical integrated device, as will become more evident hereinafter.

Assuming that the row enable signal from a particular row generator ($R_1$, for instance) is a positive going pulse such as indicated by the waveform 29, and the signal from the various column generators $C_1$, $C_2$, etc., is a negative going analog signal, then the voltage initially applied to capacitor $C_{11}$ will exceed the analog voltage 30 from column generator $C_1$ by an amount determined by waveform 29. However, when waveform 29 returns to ground potential (thereby turning transistor $T_{11}$ "off"), the voltage remaining across the capacitor $C_{11}$ will be essentially equal to that supplied by column generator $C_1$ and capacitor $C_{11}$ will be functionally in parallel with the elemental liquid crystal cell $LC_{11}$, it being assumed that during the balance of the frame period row generator $R_1$ offers but a low impedance path to ground 31.

Thus, it may be seen that although structurally capacitor 26 may be considered to be across the gate and drain of the transistor, it is functionally in parallel with the liquid crystal during the major portion of the frame, thereby effectively increasing the response time of the liquid crystal and thereafter effectively extending its dielectric relaxation constant. The capacitance of capacitor 26 should be made at least an order of magnitude greater than that of the liquid crystal element 27 in order to hold the charge until the liquid crystal material can respond.

If the liquid crystal material operates in an emulsion storage scattering mode, the displayed information may be erased by a negative-going AC signal on the various row lines or from the ground side of the liquid crystal. If the liquid crystal material operates in a dynamic scattering mode, a negative quenching pulse may be applied on the row lines by the various row generators $R_1$, $R_2$, etc. in a line-at-a-time basis to increase contrast. However, it should be noted that this may not necessarily be required inasmuch as each frame of writing automatically brings the parallel combination of liquid crystal element and capacitor to the new column voltage inasmuch as the field effect transistor can pass current in either direction.

For dynamic scattering materials, the ratio of the field effect transistor's reverse to forward resistance largely controls the speed of charging and the reverse resistance controls the storage of charge in the capacitor. For emulsion storage scattering materials, a higher parallel capacitance may be desirable because of the greater liquid crystal material leakage. Operation of the panel at TV rates requires the RC time constant for charging the storage capacitor to be in the microsecond range, and the decay time constant (RC through the transistor, with the gate off) to be longer than the milliseconds required to excite the liquid crystal material. These requirements dictate the transistor turn-on ratio to be at least three orders of magnitude. For a 50-element per inch array, the buffer capacitance can be controlled in the range of $10^{-10}$ - $10^{-12}$ farads per element, i.e., 1–100 times the liquid crystal elemental capacitance. Thus, a nominal $10^{-10}$ farad buffer capacitance and 10 msec liquid crystal response time dictate the off-resistance of the transistor to be greater than $10^8$ ohms. These considerations together determine the transistor performance requirements. For TV rate operation (1/30-second frame time, 55-microsecond write time per line, 525 lines) an the parameters relevant to MBBA as the liquid crystal material, the required TFT performance characteristics are summarized in Table 1.

TABLE I

TRANSISTOR OPERATING CHARACTERISTICS

|  | Required | Typical |
| --- | --- | --- |
| Minimum turn-on ratio | $10^3$–$10^4$ | $2\times10^3$ |
| Minimum off-resistance, $R_{SD}$ | $10^8$–$10^9\Omega$ | $2\times10^9\Omega$ |
| Operating $V_{SD}$ | 30 volts | 30 volts |
| Minimum on-current, $I_{SD}$ | 10 $\mu a$ | 40 $\mu a$ |

Figure 3:
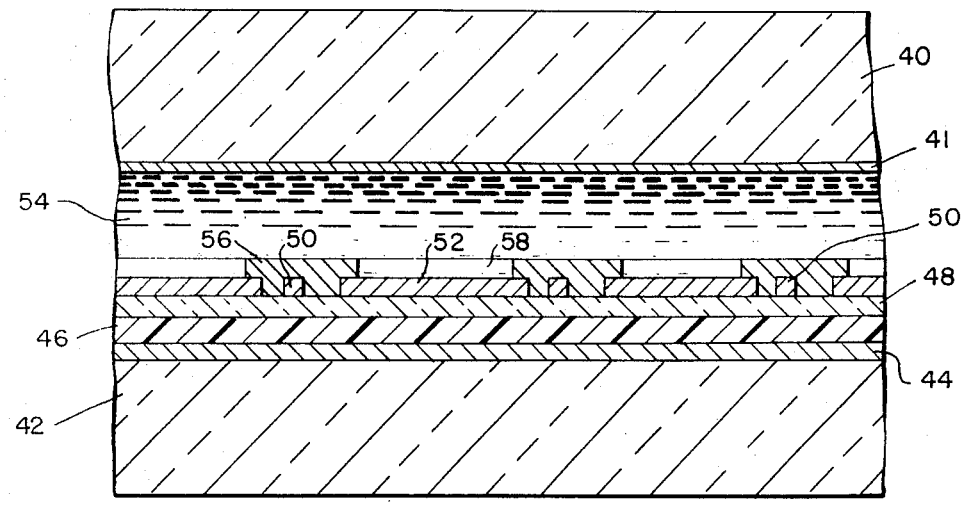
FIG. 3 shows in cross-section a portion of a display panel fabricated in accordance with the present invention including a transistor-capacitor array employing thin film transistor technology.
Figure 4:
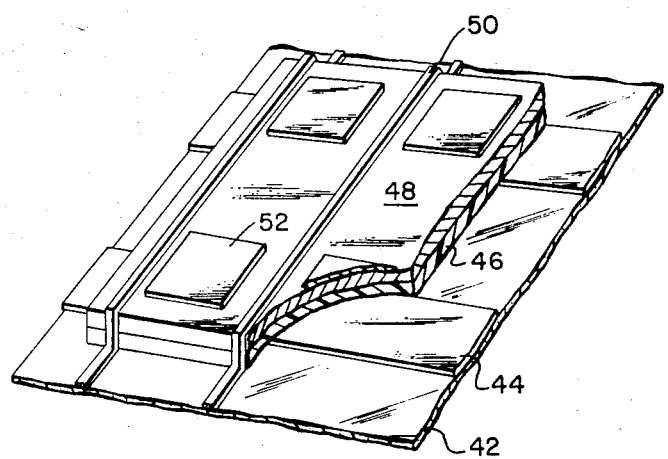
FIG. 4 is an isometric schematic diagram showing construction details of an array having gate lines of constant width.

Construction details for a thin-film transistor array embodiment of the present invention will now be discussed with reference to FIGS. 3 and 4, FIG. 3 showing a portion of the complete panel in cross-section and FIG. 4 showing the transistor array-substrate assembly (less its protective overcoating) in cutaway perspective. It may be seen that the complete liquid crystal panel comprises a top plate 40 having a transparent conductive coating 41, a substrate 42 having formed thereon a plurality of gate lines 44 over which is laid an insulation layer 46 and a semiconductor layer 48. On the upper surface of semiconductor layer 48 are formed source lines 50 oriented at right angles to the gate lines 44, each intersection therebetween defining an elemental cell. An individual drain pad 52 for each elemental cell is located also on the upper surface of the semiconductor 48 immediately adjacent a particular source line 50 and immediately above a gate line 44. The drain pad is relatively large in area and functions not only as the drain electrode for the field effect transistor but also is one plate of a storage capacitor an may form the reflective electrode which operates in conjunction with top plate 40 to activate the adjacent liquid crystal material 54.

A protective overcoating layer 56 (which may be calcium fluoride plus silicon oxide or quartz) may then be placed over the completed array. The purpose of this layer is to enhance the stability of the individual field effect transistors and also to prevent undesirable electro-chemical reactions between the liquid crystal material and the exposed portion of semiconductor layer 48.

In the embodiment of FIG. 3, holes 58 may be located in layer 56 above the drain pads 52 in order to permit the flow of current from the individual drain pad to conductive coating 41. However, it should be noted that if a purely field effect mode of operation is intended for the liquid crystal 54, then holes 58 may be dispensed with.

In an exemplary matrix display having a resolution of 30 lines to the inch, or 900 elemental cells within a one inch square, the drain pad may be approximately 0.028 inch × 0.028 inch to present better than a 70 percent reflected surface. Overall reflective area will exceed 75 percent when the reflection from the source lines 50 is included.

A complete operating panel, of course, includes liquid crystal 54 sandwiched between top plate 40 and substrate 42 with suitable mylar spacers (not shown) being used to maintain the appropriate liquid crystal film thickness. Conductive coating 41 can be a continuous coating or may be a line pattern in register with the gate lines 44 to provide for the possibility of introducing video signals via coating 41.

For the dynamic scattering mode, the liquid crystal composition for the display cell may be MBBA (whose chemical formula is N-(p-methoxybenzylidene) — p-n-butylaniline) containing 2.3 percent cholestane and 1 percent of a zwitterion dopant. This material has a low initial threshold of only 2½ volts.

The insulator layer 46 may be, for instance, either silicon monoxide or aluminum oxide (or other insulator having a suitable dielectric constant), and is deposited by standard thin film deposition techniques as semiconductor layer 48 which may be, for example, CdSe or CdS. Gate lines 44 may be of chrome or aluminum and may be formed by etching or masking on the glass substrate 42. Source lines 50 and drain pads 52 are of a reflective metal such as silver and may be formed by photolithography. Since both the source line and the drain pad are formed in the same operation, their relative position is guaranteed, and the only alignment required is positioning the drain pads over the line which, in view of the relatively great width of the gate lines, is easily accomplished.

The above discussion assumes a reflective device wherein the viewing light is reflected back to the viewer by the drain pads 52. Should, however, a transmissive mode of operation be desired, this may be readily accomplished by substituting a relatively transparent conductive material such as indium oxide, cadmium oxide, or tin oxide for the electrodes (gate lines 44, source lines 50, and drain pads 52). The transparency of semiconductor layer 48 may also be enhanced by appropriate choice of material, or by limiting the semiconductor to discrete pads in the general vicinity of the channel region located between the drain and source electrodes.

Thus it can be seen that a matrix liquid crystal display panel in accordance with the present invention may readily be fabricated using thin film transistor techniques, the size of the device and the number of elements contained therein being limited only by process limitations imposed by the particular manufacturing facilities available.

What is claimed is:

1. A matrix display panel adaptable for line-at-a-time addressing comprising:
   a substrate having fabricated on a surface thereof a transistor array including a plurality of gate lines and a plurality of source lines intersecting said gate lines;
   a plurality of row generators, one for each of said gate lines, each row generator being directly coupled to its associated gate line for enabling a row of transistors within said transistor array;
   a plurality of column generators, one for each of said source lines, each of said column generators being directly coupled to its associated source line for providing an input signal to an enabled transistor within said transistor array;
   a plurality of drain pads, one for each transistor within said transistor array, each of said drain pads being capacitively coupled to the gate line associated with its particular transistor;
   a top plate having a transparent conductor; and
   liquid crystal material sandwiched between said transistor array and said transparent conductor, and having optical properties alterable in response to the electrical field between each one of said drain pads and said conductor.

2. The panel of claim 1 wherein each of said gate lines is of a relatively constant width substantially equal to the width of said drain pads.

3. The panel of claim 1 wherein said drain pads are formed of a reflective metal material.

4. An integrated transistor array for matrix addressing of a liquid crystal material, said array comprising:
   a substrate having a planar surface;
   a plurality of gate lines formed on said substrate surface, said lines being oriented in a first direction;
   a layer of insulating material deposited over said substrate surface and said gate line;
   a layer of semiconductor material deposited over said insulating layer;
   a plurality of source lines oriented in a second direction intersecting said first direction, said source lines being formed on said semiconductor layer; and
   a plurality of drain pads also formed on said semiconductor layer, one such drain pad being located in the vicinity of each intersection of a gate line with a source line and capacitively coupled to said gate line.

5. A liquid crystal elemental cell adapted for integration into an addressable display, said cell comprising:
   a thin film transistor having gate, source and drain electrodes;
   a thin film capacitor comprising opposed portions of said gate and drain electrodes;
   a transparent conductor spaced from said thin film transistor; and
   liquid crystal material sandwiched between said transistor and said conductor and responsive to the electrical field established between said drain electrode and said transparent conductor.

6. The cell of claim 5 wherein said drain electrode is of a reflective metallic material whereby a reflective mode of display operation may be realized.

* * * * *